United States Patent [19]
Juengel

[11] Patent Number: 4,670,989
[45] Date of Patent: * Jun. 9, 1987

[54] TOUCH PROBE USING MICROWAVE TRANSMISSION

[75] Inventor: Richard O. Juengel, Romeo, Mich.

[73] Assignee: GTE Valeron Corporation, Troy, Mich.

[*] Notice: The portion of the term of this patent subsequent to Aug. 30, 2000 has been disclaimed.

[21] Appl. No.: 601,034

[22] Filed: Apr. 16, 1984

Related U.S. Application Data

[63] Continuation-in-part of Ser. No. 478,906, Mar. 25, 1983, Pat. No. 4,578,874, which is a continuation-in-part of Ser. No. 259,257, Apr. 30, 1981, Pat. No. 4,401,945.

[51] Int. Cl.$^4$ ............................ G01B 3/22; G08B 1/08
[52] U.S. Cl. ........................................ 33/558; 33/561; 340/707; 340/531
[58] Field of Search ............... 324/207, 208, 228, 233, 324/234, 236–243, 81, 96; 340/686, 687, 310 R, 539, 531, 870.18, 870.26, 707; 33/558, 561; 328/1, 5; 318/16

[56] References Cited

U.S. PATENT DOCUMENTS

| 2,934,760 | 4/1960 | Lichtman . | |
|---|---|---|---|
| 3,670,243 | 6/1972 | Fougere et al. | 324/57 R |
| 3,701,053 | 10/1972 | de Rubinat . | |
| 3,942,170 | 3/1976 | Whyte | 340/310 R X |
| 4,090,135 | 5/1978 | Farstad et al. . | |
| 4,118,871 | 10/1978 | Kirkham . | |
| 4,130,941 | 12/1978 | Amsbury | 33/174 L |
| 4,328,623 | 5/1982 | Juengel et al. | 33/174 L |
| 4,401,945 | 8/1983 | Juengel | 324/207 |
| 4,477,976 | 10/1984 | Suzuki | 33/558 X |

FOREIGN PATENT DOCUMENTS

| 0002023 | 5/1979 | European Pat. Off. . | |
| 0117354 | 9/1984 | European Pat. Off. . | |
| 2097930A | 10/1982 | United Kingdom . | |
| 2121966A | 1/1984 | United Kingdom . | |
| 01620 | 4/1984 | United Kingdom | 33/558 |

OTHER PUBLICATIONS

"Communications au moyen de Gunnplexer" 2198 Toute l'Electronique, 1983/France.
"A Microwave Modulation Telemetering System" National Telemetering Conference Report, May 1960.

Primary Examiner—Reinhard J. Eisenzopf
Assistant Examiner—Warren S. Edmonds
Attorney, Agent, or Firm—Harness, Dickey & Pierce

[57] ABSTRACT

Automated gaging apparatus for use with a machine tool system is disclosed. In a preferred embodiment, the apparatus is adapted for use with a touch probe and includes circuitry for frequency shift keying a subcarrier signal responsive to contact occurring between the touch probe and a workpiece. The subcarrier is used to switch a source of microwave radiation, such as a Gunn diode oscillator, on and off at the shifted frequency. The microwave signal is detected by a remote receiver, and the detected signal is coupled to the controller for the machine tool system for use in gaging the workpiece.

20 Claims, 5 Drawing Figures

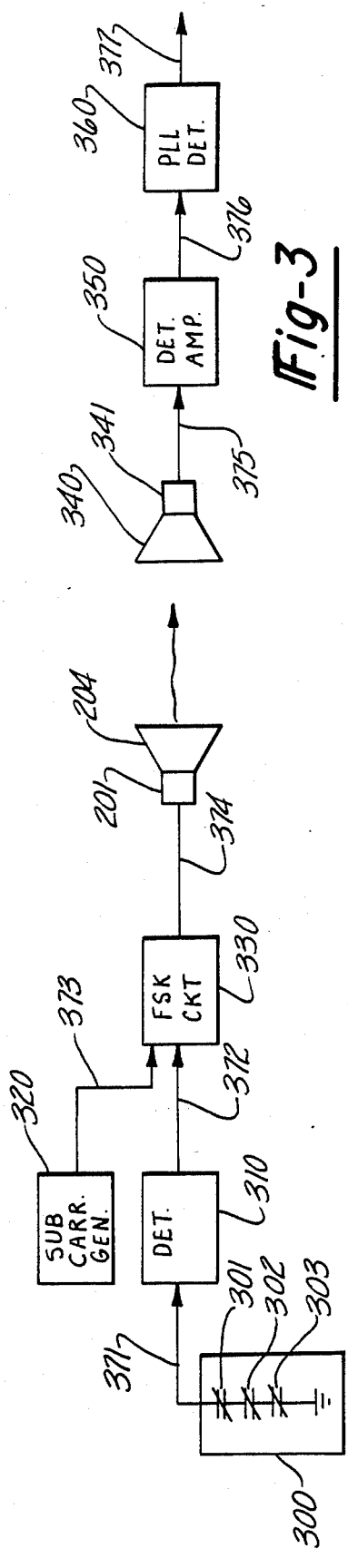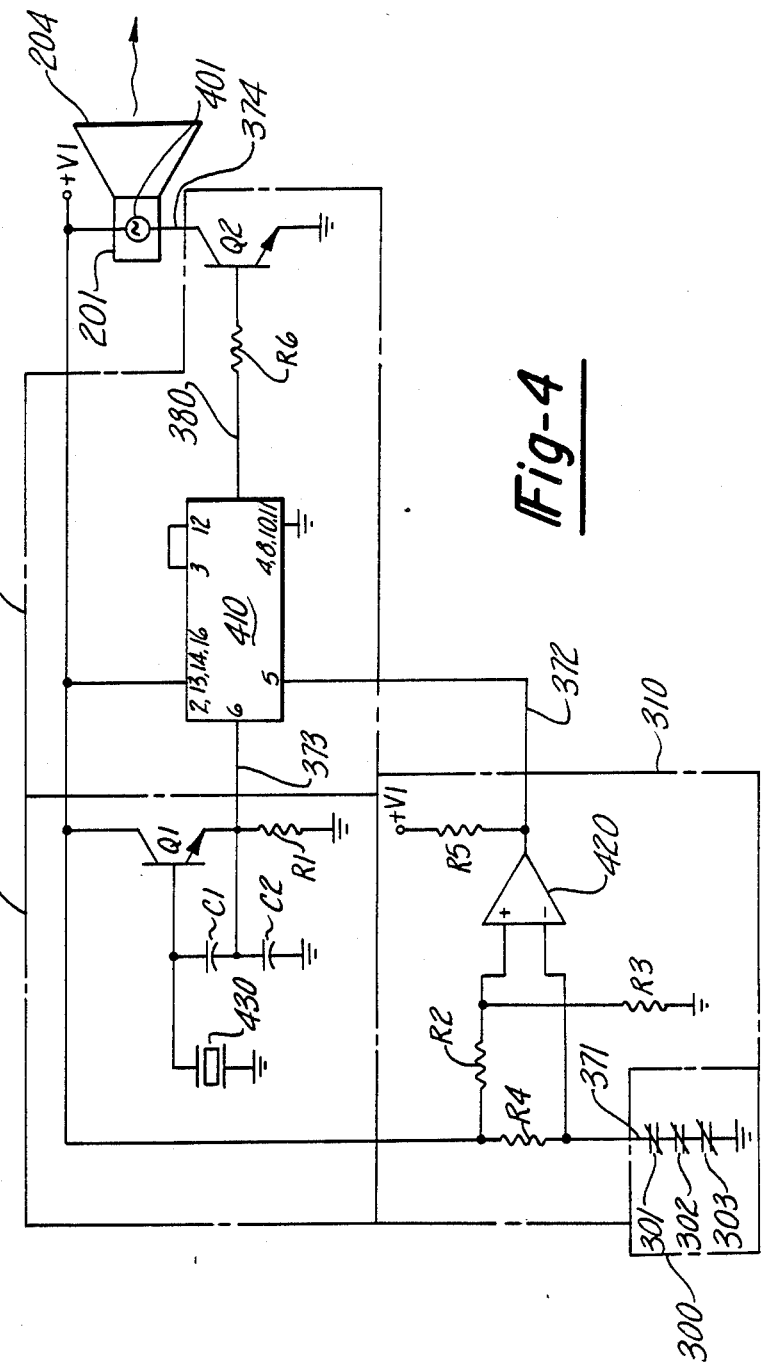

TOUCH PROBE USING MICROWAVE TRANSMISSION

This invention is a continuation-in-part of co-pending U.S. patent application Ser. No. 478,906, filed Mar. 25, 1983, now U.S. Pat. No. 4,578,874 whose title was amended to "Probe With Optical Transmission Scheme", which is a continuation-in-part of U.S. patent application Ser. No. 259,257, filed Apr. 30, 1981, now U.S. Pat. No. 4,401,945.

BACKGROUND OF THE INVENTION

1. Field of the Invention

The invention generally concerns machined-performed, or automatic, gaging. More particularly, the invention relates to wireless telemetry of gaging data by a workpiece probing device controlled by a machine tool system.

2. Discussion of the Prior Art

Automated or machine controlled gaging of workpieces in machine tool environments optimally is performed by the machine tool system as one of a variety of operations conducted on the workpiece. This, in turn, requires a gaging or probing unit configured for removable retention in a machine tool magazine in the same way as cutting tools are retained therein. Such storage and machine controlled manipulation of the gaging unit also optimally involves wireless tranmission of the data generated by the gaging or probing unit.

The advent of programmable control in machine tool systems has enabled use of such gaging units arranged as touch probes, whereby the machine control program calculates dimensional information concerning a workpiece by determining the location of certain surfaces of the workpiece relative to the coordinates of movement between the machine tool spindle axis and the workpiece. One known touch probe is disclosed in U.S. Pat. No. 4,118,871—Kirkham, and utilizes radio frequency telemetry wherein the touch sensing and transmission function are combined by forming the probe stylus as an antenna whose output is effectively short circuited on contact with the workpiece. Another known touch probe is disclosed in my prior U.S. Pat. No. 4,401,945, and U.S. Ser. No. 478,906 now U.S. Pat. No. 4,578,874 which utilize optical telemetry.

The Kirkham probe suffers the disadvantages of having poor repeatability under conditions where the contacted workpiece may be covered with a nonconductive film, and susceptibility to electromagnetic interference, since the required radio frequency range must be relatively low in order to have an effective short circuit at the probe antenna upon its contact with the workpiece.

My prior infrared telemetry probes and the Kirkham probe may have operability problems in those applications wherein relatively deep workpiece bores or cavities must be probed or gaged, therefore removing the probe transmitting apparatus from line of sight with a remote receiver associated with the machine tool controller. The Kirkham type probe may not operate under such conditions due to the well-known waveguide cut-off effect, wherein the workpiece bore or cavity may be viewed as a waveguide having a cross sectional dimension less than half the wave length of the telemetered signal. At the frequencies required for the Kirkham probe, severe attenuation from the cut-off effect is inevitable for most typical workpiece cavity sizes encountered. The probes of U.S. Pat. No. 4,401,945 and of U.S. patent application Ser. No. 478,906 may or may not work under such conditions, depending upon the strength and direction of reflected optical signals from the probe.

SUMMARY OF THE INVENTION

In accordance with the invention a gaging unit is provided which includes probing apparatus, such as a contact switch or sensor associated with a probe stylus, for probing the workpiece and sensing a characteristic of the workpiece, such as contact between the stylus and the workpiece. A modulation circuit of the gaging unit generates a modulating signal as a function of the output signals generated by the probing apparatus, and a source of microwave radiation in the gaging unit has its microwave output modulated in accordance with the modulating signal. In a further aspect of the invention, a microwave receiver unit located remotely from the gaging unit, is operative to receive the emitted modulated microwave signal, to demodulate the received signal, to derive from the modulated signal a receiver output signal indicative of whether or not the workpiece characteristic has been sensed, and to couple the receiver output signal to the machine tool controller.

It is a feature of this invention that there is no requirement for line-of-sight alignment between the transmitting gaging unit and the remote receiver unit.

It is a further feature of this invention that microwave frequencies used for telemetry gaging data are high enough so as not to be adversely affected by electromagnetic noise found in typical machine tool system environments.

BRIEF DESCRIPTION OF THE DRAWING

The objects and features of the invention will become apparent from a reading of a detailed description of an illustrative embodiment, taken in conjunction with the drawing, in which:

FIG. 3 is a functional block diagram of touch probe and remote receiver circuitry designed in accordance with the principles of the invention;

FIG. 4 is a schematic diagram setting forth more details of the touch probe circuitry portion of FIG. 3.

DETAILED DESCRIPTION

Figure 1:
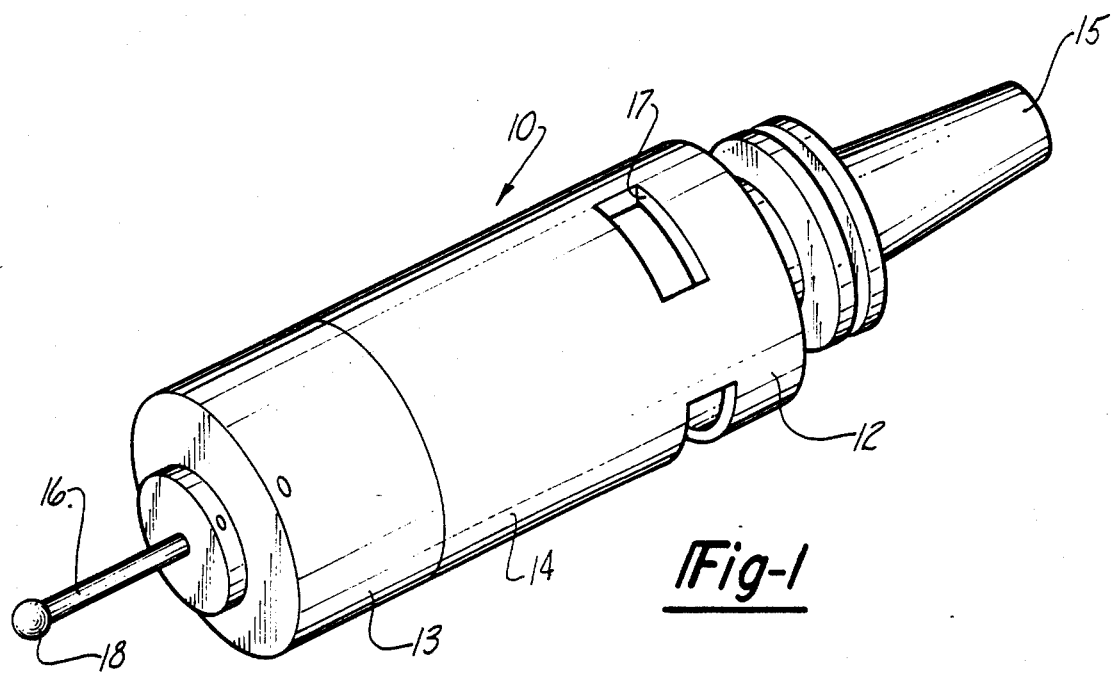
FIG. 1 is a perspective view of a gaging or touch probe unit designed in accordance with the principles of the invention.

It is to be understood that identical numerical designations are placed on the same components in the various figures of the drawing.

Figure 2:
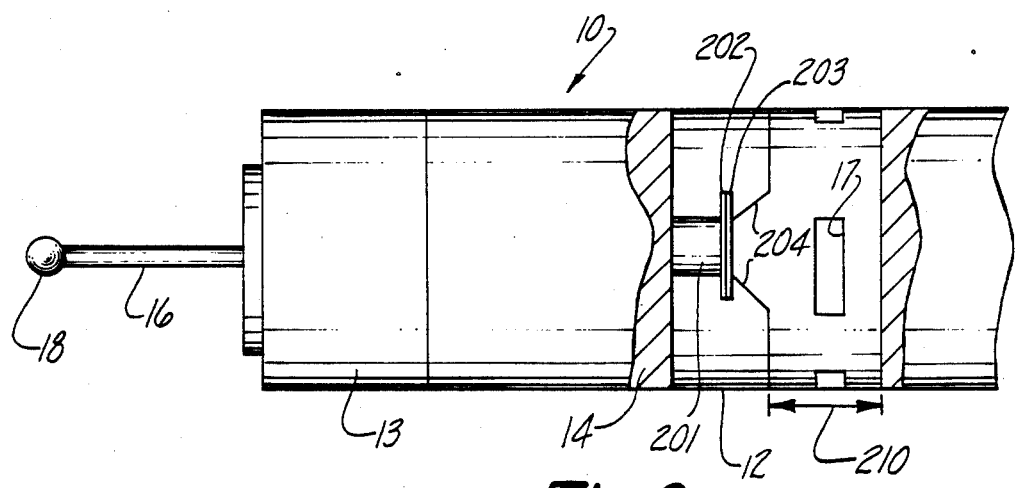
FIG. 2 is a partial cross-sectional view of the unit of FIG. 1 taken normal to the longitudinal axis of the unit.

With reference to FIGS. 1 and 2, housing 10 for either a gaging unit such as a touch probe is shown. Housing 10, in this particular embodiment, contains the touch probe switch and telemetry apparatus depicted in FIG. 4 to be described below. A stylus 16 extends from a measuring end of housing 10 and terminates in a suitably shaped (in this embodiment, spherical) contact element 18. Stylus 16 at its inner end (not shown) is coupled to a suitable touch detection switch or sensor contained in housing switch head portion 13. One such detector switch suitable for use with the invention is disclosed in U.S. patent application Ser. No. 388,187, filed June 14, 1982, titled "Touch Probe, now U.S. Pat. No. 4,451,987" and assigned to the same assignee as the instant invention.

Housing section 14 (FIG. 2) contains the detector and telemetry circuitry shown in part of FIG. 4 to be discussed below. Adjacent housing portion 14 in housing portion 12 is mounted a Gunn diode microwave source unit 201 coupled via mounting flanges 202 and 203 to a radiating horn antenna 240. Antenna 204 emits microwave radiation generated by source 201 into a housing cavity having an axial dimension 210. The emitted microwave radiation is then radiated outwardly from housing 10 in a generally spherical pattern via housing windows 17 equiangularly spaced about the periphery of housing portion 12. Dimension 210 and the dimensions of window 17 are chosen to minimize radiation attenuation between the output of antenna 204 and free space surrounding probe 10. One rule of thumb is that dimension 210 must be greater than one-half wave length of the microwave radiation emitted from antenna 204.

The term "microwave" as used in this description carries a conventional meaning in the art and refers to signals having frequencies in the range on the order of 200 MHz to on the order of 100 GHz. See, for example, page 103 of Reference Data for Radio Engineers, Fifth Edition, March 1970, International Telephone and Telegraph Corporation.

At an end of housing 10 opposite the probe mounting end, a suitable adaptor 15 is provided. Adaptor 15 enables housing 10 to be incorporated into a automated, programmably controlled machine tool system, such as an NC machining center, in the same way as a typical cutting tool. Alternatively, housing 10 could be equipped with an appropriately designed housing adaptor or extension suitable for use by the "hand" or gripping element of an automaton or automatic tool changer.

Apparatus suitable for use as a touch probe system with microwave telemetry is set forth in functional block diagram form in FIG. 3, the functional elements depicted in the left hand portion of FIG. 3 being situated in portions 12, 13 and 14 of housing 10 of FIG. 1.

Positioned in portion 13 of housing 10 is sensor switch unit 300, which, from an electrical circuit equivalence viewpoint, is comprised of the series connection of normally closed switch contacts 301, 302 and 303. The physical relationship between contacts 301, 302 and 303 and stylus 16 (FIG. 1) could, for example, be that described in the above cited U.S. patent application Ser. No. 388,187, now U.S. Pat. No. 4,451,987 which is hereby incorporated by reference. Such an arrangement provides for the movement toward the open state of at least one of the three contacts 301, 302, 303 whenever the probe stylus contacts the workpiece. Upon such contact opening, low impedance ground potential will be removed from path 371, the input to detector circuit 310. Output 372 of detector 310 is coupled to one of two inputs to modulation or frequency shift keying (FSK) circuit 330.

Subcarrier generator circuit 320 is coupled via path 373 to the other input of FSK circuit 330. Output 374 of FSK circuit 330 is coupled to a control input of a microwave frequency radiation source which, for example, could be comprised of a Gunn diode oscillator unit 201 having its output coupled to horn antenna 204. To this point, all apparatus described with reference to FIG. 3 is carried by probe housing 10 of FIGS. 1 and 2.

Modulated microwave energy emitted by horn antenna 204 is remotely wirelessly received by a receiver unit comprising receiving horn antenna 340, heterodyne receiver unit 341 coupled to an output of receiving antenna 340, demodulator and amplifier/filter circuitry 350 having an input 375 coupled to the heterodyned output of receiver 341 and an output 376 coupled to a phase-locked-loop (PLL) detector circuit 360, whose output 377 is, in turn, coupled to the controller of the machine tool system (not shown) using the disclosed automatic gaging apparatus of FIG. 3.

The operation of the system depicted in FIG. 3 may be summarized as follows. Generator 320 produces a subcarrier signal, for example in the range of 150 KHz to 300 KHz. This subcarrier is frequency modulated, for example by frequency shifting or frequency shift keying (FSK), by FSK circuit 330 in response to an indicating signal from detector 310 that probe contact with a workpiece has occurred. One system has been operationally tested using a frequency shift of the subcarrier from a pulse repetition rate of 150 KHz to a repetition rate of 165 KHz whenever contact occurs. The FSK output 374 of FSK circuit 330 is then used to switch a microwave generator device, such as a Gunn diode oscillator 201, on and off at the frequency of the subcarrier. This pulse train of microwave oscillations (for example on the order of 10.525 GHz±25 MHz is radiated by probe horn antenna 204 for reception by horn antenna 340 at the remote receiver unit. At heterodyne receiver 341, the radiated microwave frequency signal is converted, via heterodyne action caused by mixing the received signal with a locally generated signal, to a lower intermediate frequency (IF) signal, for example on the order of 45 MHz, for easier amplification and demodulation/detection by amplifier/detector circuit 350. The demodulated output signal of amplifier/detector 350 at conductor 376 is substantially equivalent to the output of FSK circuit 330 (e.g. a pulse train with a pulse repetition rate of either 150 KHz or 165 KHz, depending upon whether probe stylus contact with the workpiece has occurred). The frequency, or pulse repetition rate, of the demodulated signal is fed to PLL discriminator 360 for derivation of a signal indicating touch or no-touch for presentation via path 377 to the controller of the machine controller system.

Figure 5:
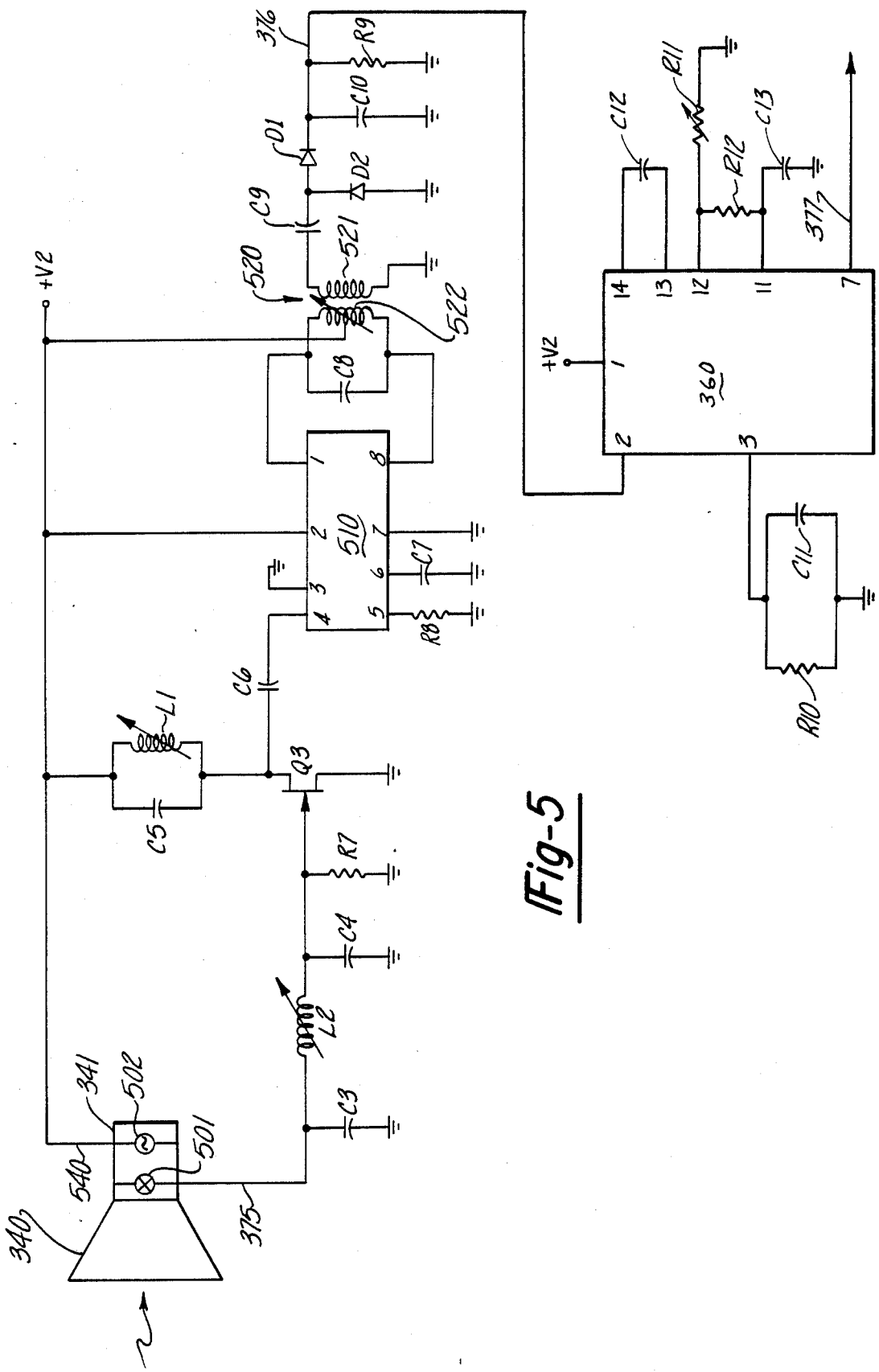
FIG. 5 is a schematic diagram setting forth more details of the remote receiver circuitry portion of FIG. 3.

A more detailed example of certain of the functional components of FIG. 3 are set forth in FIGS. 4 and 5. With reference to FIG. 4, in the idle or noncontacting stylus state, ground potential is coupled, via the serial connection of normally closed contacts 301, 302, 303 of switch detector 300, to input 371 of detector 310, which is comprised to resistors R2, R3, R4 and R5, analog comparator 420 and bias reference potential source +V1. Element 420 could, for example, be commercially available operational amplifier type LM393 analog comparator.

Input 371 is coupled to an inverting input of comparator 420 and to a first terminal of resistor R4. A second terminal of resistor R4 is coupled to a first terminal of resistor R2 and to reference source +V1. A second terminal of resistor R2 is coupled to a non-inverting input of comparator 420 and to a first terminal of resistor R3, which has a second terminal coupled to ground potential. Output 372 of comparator 420 is coupled via resistor R5 to reference source +V1 and to FSK circuit 330 to be described below.

Subcarrier generator 320 is a crystal controlled oscillator comprising crystal 430, capacitors C1 and C2, resistor R1, transistor Q1 and reference source plus V1. A first terminal of crystal 430 is coupled to ground potential, while a second terminal is coupled to a first terminal of capacitor C1 and to a base electrode of transistor Q1. Transistor Q1 could be, for example, a commercially available type 2N4401 NPN transistor. A second terminal of capacitor C1 is coupled to an emitter electrode of transistor Q1, generator output 373, a first terminal of resistor R1, and a first terminal of capacitor C2. Second terminals of capacitor C2 and resistor R1 are both coupled to ground potential. A collector electrode of transistor Q1 is coupled to reference potential source +V1.

FSK circuit 330 is comprised of a variable divider/counter circuit 410, resistor R6, transistor Q2, and reference potential source +V1. Divider counter 410 could be, for example, a commercially available type 4526 CMOS integrated circuit (IC), while Q2 could comprise a type 2N4401 NPN transistor. A first FSK circuit input 373 is coupled to pin 6 of IC 410, while a second input 372 is coupled to pin 5 of IC 410. IC 410 has pins 2, 13, 14 and 16 coupled to reference source +V1, pin 3 coupled to pin 12, pins 4, 8, 11 and 10 coupled to ground potential, and output pin 1 coupled via conductor 380 to a first terminal of resistor R6. A second terminal of resistor R6 is coupled to a base electrode of transistor Q2, which has its emitter electrode coupled to ground potential and its collector electrode coupled to control input 374 of microwave source 201.

Source 201 includes, for example, a Gunn diode oscillator 401 whose output is coupled via a waveguide section to radiating horn antenna 204. Source 201 could comprise a type MA-86651 Gunn oscillator source, commercially available from Microwave Associates.

The apparatus described above with reference to FIG. 4 operates as follows. Upon contact by the probe stylus with a workpiece, at least one of contacts 301, 302 and 303 begins to open, thereby removing ground potential from the inverting input of comparator 420. Since, under this condition, the potential at the non-inverting input of comparator 420 is no longer higher than that at the inverting input, output 372 of comparator 420 goes to a logic low condition.

A logic low signal at path 372 causes divider/counter 410 of FSK circuit 330 to divide the input pulse train at input pin 6 by a factor of 10. A logic high condition at pin 5 results in a divisor of 11. Crystal 430, in combination with transistor Q1, generates a 1.65 MHz signal for presentation via input 373 to pin 6 of divider/counter 410. Hence, whenever the probe stylus is in the idle or rest position, a 150 KHz (1.65 MHz divided by 11) pulse train is present at output 380 of divider/counter 410, while upon stylus deflection, a 165 KHz (1.65 MHz divided by 10) pulse train is generated, the resultant frequency shift indicating contact between probe stylus and workpiece.

Transistor Q2 is driven on and off by the frequency shifted output 380 and, in turn, via control input 374, switches the Gunn diode oscillator on and off at either 150 KHz or 165 KHz, depending upon the stylus contact state. Thus, microwave frequency bursts having a carrier frequency on the order of 10.525 GHz are emitted by antenna 204 at a pulse repetition rate of either 150 KHz or 165 KHz in this embodiment. Other subcarrier frequencies can be used to allow several touch probes or gages to operate in the same area without interference. This is easily accomplished by merely changing crystal 430 of FIG. 4 and the PLL detector frequency used in detector 360 of FIG. 3.

With reference to FIG. 5, a more detailed example of the remote receiver unit of FIG. 3 is set forth. Microwave radiation emitted by the probe circuitry of FIG. 4 is received by horn antenna 340 whose output is waveguide coupled to a heterodyne receiver unit 341 including local microwave source 502 and mixer 501. Unit 341 could comprise a type FO-UP11K heterodyne microwave receiver, commercially available from Mitsubishi Electric Company. With this heterodyne unit, a local microwave frequency of, for example 10.48 GHz is mixed with the received signal resulting in a mixer output IF signal at path 375 having a heterodyned difference frequency on the order of 45 MHz, due to heterodyne action.

The IF signal is coupled via path 375 to a low noise pre-amplifier circuit comprising capacitors C3, C4 and C5, variable inductors L1 and L2, resistor R7 and field effect transistor (FET) Q3, which could comprise type MFP102, commercially available from Motorola Corporation. The pre-amplifier is tuned to a center frequency substantially equal to that of the IF signal at input 375. Input 375 is coupled to the junction of first terminals of capacitor C3 and variable inductor L2. A second terminal of capacitor C3 is coupled to ground potential. The junction of a second terminal of L2 and a first terminal of capacitor C4 is coupled to a gate electrode of FET Q3 and a first terminal of resistor R7. Second terminals of capacitor C4 and resistor R7 are each coupled to ground potential. C3, C4 and L2 comprise an input PI filter tuned to the received IF frequency.

A source electrode of Q3 is coupled to ground potential, while a drain electrode of Q3 is coupled to reference potential +V2 via a tank circuit comprising the parallel combination of capacitor C5 and variable inductor L1 and to pin 4 of IC 510 via coupling capacitor C6. Tank circuit L1, C5 is tuned to the center frequency of the IF signal.

Integrated circuit 510, for example a type MC1350P commercially available from Motorola Corporation, is an IF amplifier having a push pull output stage between pins 1 and 8 thereof. Pins 3 and 7 of amplifier 510 are each coupled to ground potential, pin 2 is coupled to reference source +V2, and pins 5 and 6 are coupled to ground potential via resistor R8 and capacitor C7, respectively.

Output pins 1 and 8 are coupled to a push pull tank circuit tuned to the IF signal's center frequency, the tank circuit comprising the parallel combination of capacitor C8 and variable transformer coil 522 having a center tap coupled to reference source +V2.

The amplifier output is coupled via transformer 520 and DC blocking capacitor C9 to a peak-to-peak detector or demodulator circuit comprising diodes D1 and D2, capacitor C10 and resistor R9. Transformer secondary coil 521 has a first terminal, coupled to ground potential and a second terminal coupled via capacitor C9 to the junction of a cathode electrode of diode D2 and an anode electrode of diode D1. The anode electrode of diode D2 is coupled to ground potential, while the cathode electrode of diode D1 is coupled to input 376 of PLL detector circuit 360 and to first terminals of capacitor C10 and resistor R9. Second terminals of capacitor C10 and R9 are each coupled to ground potential.

PLL Circuit 360 could, for example, comprise type XR 2211, commercially available from EXAR, Incorporated. Output 376 of the demodulator circuit is coupled to input pin 2 of PLL 360. PLL 360 has pin 1 coupled to reference potential source +V2, capacitor C12 is coupled across pins 13 and 14, and resistor R12 is coupled across pins 11 and 12. Pin 12 of PLL 360 is additionally coupled to ground potential via variable resistor R11, while pin 11 is coupled to ground potential via capacitor C13. Pin 3 of PLL 360 is coupled to ground potential via the parallel combination of resistor R10 and capacitor C11. Output 377 to the machine tool controller is coupled to pin 7 of PLL 360.

The bandwidth of the input signals recognized by PLL 360 is determined by appropriate selection of resistor R10 and capacitor C11. The center frequency to be detected by PLL 360 is determined by the values of resistor R11 and capacitor C12, while the response time of PLL 360 is determined by the values of resistor R12 and capacitor C13.

With the pin connections shown in FIG. 5, output 377 will assume the logic high state whenever the frequency, or pulse repetition rate, of the signal at pin 2 of PLL 360 shifts from 150 KHz to 165 KHz.

With the apparatus as shown in FIG. 5, 10.525 GHz bursts of microwave energy are received by unit 341, heterodyned down to an IF signal on the order of 45 MHz bursts, amplified and filtered by the pre-amplifier circuit centered about FET Q3, further strengthened by IF amplifier 510, and demodulated by a detector circuit using diodes D1 and D2. This results in the original 150/165 KHz subcarrier pulse train at input 376 of the PLL circuit 360. PLL 360 recognizes the 150 KHz to 165 KHz shift in frequency of the demodulated signal which occurs whenever the probe stylus is deflected from its rest position and passes, via path 377, a logic high signal indicative of such a frequency shift to the machine controller (not shown) of the machine tool system utilizing the telemetry touch probe system of this embodiment.

Other methods of modulating the microwave frequency carrier signal to reflect gaging or probe contact data could be used, such a direct frequency modulation, simple on/off keying with no other modulation, or amplitude modulation. However, the FSK approach disclosed in conjunction with the above description is preferred for the following reasons. In direct frequency and simple on/off modulation systems, conventional apparatus capable of being battery powered and small enough to be housed in a portable gaging or touch probe device can typically achieve only limited frequency modulation of about ±4 MHz. Since this is much less than the ±10 MHz thermal drift typically encountered, the use of complex, expensive frequency tracking methods at the receiver may become necessary, or else receiver band width must be widened to the extent that signal recovery and signal-to-noise ratio will be very poor. Additionally, direct frequency modulation or simple on/off keying has no capability for use in close proximity with other similar automated gaging systems, without interference among the various gages or probes being employed.

The FSK modulation method of the illustrative embodiment offers the additional advantage of relatively low microwave power drain, since the Gunn diode oscillator is pulsed on for very short time periods compared to the continuous transmission of the carrier in direct frequency modulation systems.

It should be noted that the invention described herein has been illustrated with reference to a particular embodiment. It is to be understood that many details used to facilitate the descriptions of such a particular embodiment are chosen for convenience only and without limitation on the scope of the invention. Many other embodiments may be devised by those skilled in the art without departing from the scope and spirit of the invention. Accordingly the invention is intended to be limited only by the scope and spirit of the appended claims.

I claim:

1. Automated gaging apparatus for detecting the position of a probe relative to a workpiece, said apparatus comprising:
   a battery operated device having housing shaped to be mounted in an automated machine tool for performing operations on a workpiece, said housing including probing means for sensing a characteristic of the workpiece and generating a probing means output signal relative to the sensed characteristic, modulation means coupled to the probing means for generating a modulating signal at an output thereof in accordance with the probing means output signal, microwave radiation means including a source for wirelessly emitting microwave radiation above 1 GHz when the source is energized, and means for coupling the modulating signal to a control input of the source for energizing the source at a repetition rate controlled by the modulating signal whereby said device wirelessly emits bursts of microwave frequency radiation at repetition rates depending upon the sensed characteristic of the workpiece.

2. The automated gaging apparatus of claim 1 wherein the probing means is operative to sense contact between the probing means and the workpiece.

3. The automated gaging apparatus of claim 2 wherein the modulator means is operative to modulate a carrier frequency of the emitted microwave signal by frequency shift keying, wherein the carrier frequency is switched on and off at a first pulse repetition rate whenever the probing means senses non-contact between the probing means and the workpiece and at a second pulse repetition rate whenever the probing means senses contact between the probing means and the workpiece.

4. The automated gaging apparatus of claim 3 wherein the probing means comprises switching means having at least one contact means whose state is controlled in accordance with contact and non-contact between the probing means and the workpiece, and detector means having an input coupled to the switching means and an output coupled to the modulation means, the detector means operative to generate a probing means output signal having a first value whenever the contact means state indicates non-contact by the probing means with the workpiece and having a second value whenever the contact means state indicates contact by the probing means with the workpiece.

5. The automated gaging apparatus of claim 4 wherein the modulation means comprises variable divider means having first and second inputs and an output, a reference oscillator for generating a pulse train having a reference pulse repetition rate, the reference oscillator coupled to the first divider means input, the second divider means input coupled to the detector means output, the divider means operative to divide the reference pulse repetition rate by a first number whenever the first value of the probing means output signal is presented to the second divider means input, to divide the reference pulse repetition rate by a second number whenever the second value of the probing means output signal is presented to the second divider means input, and to present the divided reference pulse train to the divider means output.

6. The automated gaging apparatus of claim 5 wherein the modulation means further comprises electronic switch means coupled between the divider means output and the modulation means output, operative to couple the modulating signal to the modulation means output as a function of the divided reference pulse train.

7. The automated gaging apparatus of claim 6 wherein the electronic switch means comprises a transistor having a base electrode coupled to the output of the divider means, an emitter electrode coupled to a source of a first reference potential, and a collector electrode comprising the modulation means output coupled to the control input of the source of microwave radiation.

8. The automated gaging apparatus of claim 1 wherein the source of microwave radiation includes a Gunn diode oscillator coupled to the control input and having an output, and a radiating horn antenna coupled to the Gunn diode oscillator output.

9. The automated gaging apparatus of claim 8 further comprising a cavity in the gaging means housing communicating with an output of the radiating horn antenna, and a plurality of openings in a peripheral surface of the housing, each opening communicating with the cavity and positioned to enable a substantially symmetrical spherical radiation pattern from the housing for the microwave radiation emitted from the output of the horn antenna.

10. The automated gaging apparatus of claim 7 wherein the source of microwave radiation includes a Gunn diode oscillator having a first diode electrode coupled to the control input and a second diode electrode coupled to a source of a second reference potential, a waveguide section excited by microwave radiation emitted by the Gunn diode oscillator, and a radiating horn antenna coupled to the waveguide section.

11. The automated gaging apparatus of claim 1 further comprising:
microwave receiving means located remotely from the device, operative to receive the emitted modulated microwave signal, to demodulate the received signal, to derive from a demodulated signal a receiver output signal related to the probing means output signal, and to couple the receiver output signal to the machine tool controller.

12. The automated gaging apparatus of claim 11 wherein the microwave receiving means comprises:
a receiving horn antenna having an output,
a microwave signal receiver unit having an input coupled to the output of the receiving antenna and having an output,
amplification means having an input coupled to the output of the microwave signal receiver unit and having an output,
demodulation means having an input coupled to the output of the amplification means and operative to generate the demodulated signal at an output of the demodulation means, and
derivation means coupled between the demodulation means output and the machine tool controller, operative to generate the receiver output signal on receipt of the demodulated signal.

13. The automated gaging apparatus of claim 12 wherein the microwave signal receiver unit further comprises:
a heterodyne receiver having an input waveguide section coupled to the output of the receiving horn antenna, means for generating a local signal at a first microwave frequency, a mixer having a first input coupled to the waveguide section for receipt of the microwave signal emitted by the gaging means and a second input coupled to the means for generating the local signal, the mixer operative via heterodyne action to combine the local signal with the received signal to generate at a heterodyne receiver output a mixer output signal having a carrier frequency equal to the difference between a carrier frequency of the received microwave signal and the first microwave frequency.

14. The automated gaging apparatus of claim 13 wherein the amplification means further comprises:
a preamplifying bandpass filter circuit having an input coupled to the amplification means input and tuned to a center frequency substantially equal to the carrier frequency of the mixer output signal, and
an intermediate frequency (IF) amplifier circuit having an input coupled to an output of the preamplifying filter circuit and an output coupled to the amplification means output, operative to generate bursts of an amplified IF signal having a frequency substantially equal to the carrier frequency of the mixer output signal.

15. The automated gaging apparatus of claim 14 wherein the demodulation means further comprises:
a peak-to-peak detector circuit coupled to the demodulation means input for receipt of the amplified IF signal, the detector circuit operative to generate at the demodulation means output a pulse train corresponding to an envelope of the amplified IF signal and having a pulse repetition rate related to the modulating signal generated by the modulation means.

16. The automated gaging apparatus of claim 15 wherein the derivation means comprises a phase locked loop circuit operative to determine the pulse repetition rate of the pulse train generated by the peak-to-peak detector circuit and to generate the receiver output signal indicative of the determined rate.

17. Apparatus for detecting contact with a workpiece, said apparatus comprising:
a battery operated unit having a first housing section shaped for insertion into a receptacle in an automated machine tool, said unit further including a switch head portion having a moveable stylus at one end thereof that moves when it comes into contact with the workpiece; circuit means in the housing for generating a first signal when the stylus is not contacting the workpiece and for generating a second different signal when the stylus makes contact with the workpiece; the housing further including a section having a cavity therein in which microwave generation means including a source of microwave radiation above 1 GHz is located, with the housing further including at least one window therein through which microwave radiation from the source is emitted to a remote receiver, said microwave radiation having different characteristics depending upon the position of the stylus relative to the workpiece; and remote receiver means adapted to receive the emitted microwave radiation from the unit, said receiver means adapted to receive the emitted microwave radiation from the unit, said receiver means including means for coupling the received signal to a controller for the machine tool whereby information about the workpiece can be derived.

18. The apparatus of claim 17 wherein said microwave generation means includes a Gunn diode oscillator, a radiating horn antenna coupled to the Gunn diode oscillator, and wherein said housing includes a plurality of openings in a peripheral surface thereof that communicate with the radiating horn antenna to enable transmission of the microwave radiation in substantially a symmetrical spherical pattern from the unit.

19. The apparatus of claim 18 wherein said Gunn diode provides microwave radiation above 1 GHz when energized by an energization signal, and wherein said circuit means provides said energization signal at a first frequency when the stylus is not touching the workpiece, with the circuit means generating said energization signal at a second frequency when the stylus is contacting the workpiece whereby bursts of microwave radiation are modulated by the first and second signals.

20. The apparatus of claim 19 wherein said receiver means further includes demodulation means for demodulating the modulated microwave radiation, said demodulation means being further adapted to provide an output signal to the machine tool controller indicating whether or not the stylus is in contact with the workpiece.

* * * * *